United States Patent
Ahlström et al.

(10) Patent No.: US 8,107,450 B2
(45) Date of Patent: Jan. 31, 2012

(54) REDIRECTING DATA FLOW OF A SECONDARY PDP TO A PRIMARY PDP BEFORE ESTABLISHING THE SECONDARY PDP CONTEXT

(75) Inventors: Folke Ahlström, Västra Frölunda (SE); Lasse Olsson, Stenungsund (SE); Jan Backman, Kärna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 792 days.

(21) Appl. No.: 12/159,743

(22) PCT Filed: Dec. 30, 2005

(86) PCT No.: PCT/EP2005/014137
§ 371 (c)(1),
(2), (4) Date: Jun. 30, 2008

(87) PCT Pub. No.: WO2007/076880
PCT Pub. Date: Jul. 12, 2007

(65) Prior Publication Data
US 2009/0052419 A1    Feb. 26, 2009

(51) Int. Cl.
*H04W 4/00* (2009.01)
*H04L 12/28* (2006.01)
*H04L 12/56* (2006.01)

(52) U.S. Cl. ........................................ 370/338; 370/400

(58) Field of Classification Search ........................ None
See application file for complete search history.

(56) References Cited

U.S. PATENT DOCUMENTS

| | | | |
|---|---|---|---|
| 2005/0101290 A1* | 5/2005 | Melgosa | 455/406 |
| 2005/0135389 A1* | 6/2005 | Hurtta | 370/401 |
| 2006/0153124 A1* | 7/2006 | Kant et al. | 370/328 |

* cited by examiner

*Primary Examiner* — Chirag Shah
*Assistant Examiner* — Srinivasa Reddivalam
(74) *Attorney, Agent, or Firm* — Roger S. Burleigh

(57) ABSTRACT

A solution in a telecommunications infrastructure network for creating a secondary PDP context for a time critical application, ensuring that no packets are lost by masquerading a primary PDP context as the secondary PDP context. This may be achieved by for instance sending a fake TEID or including a filter in a PDP creation request for the secondary PDP context and updating the GGSN with a correct TEID or a new Traffic Flow Template (TFT) when the secondary PDP context is established.

4 Claims, 7 Drawing Sheets

REDIRECTING DATA FLOW OF A SECONDARY PDP TO A PRIMARY PDP BEFORE ESTABLISHING THE SECONDARY PDP CONTEXT

TECHNICAL FIELD

The present invention relates to a method, apparatus and network for handling real time demanding applications and in particular to a solution masquerading for a PDP context.

BACKGROUND OF THE INVENTION

In current telecommunication networks data traffic streams are increasingly moving towards real time applications, i.e. applications where streaming data is of importance for the user experience. Such applications include for instance voice communication, video conferences or other multimedia sessions, whereas other communication sessions are not real time critical such as browsing, email exchange, and other information data types that may be communicated without any degrade in user experience.

However, radio resources are sparse and treating the different types of messages in an identical manner is a waste of these resources. Therefore different ways of solving this problem have been designed in for instance GSM/GPRS and WCDMA systems. These systems often set up additional radio resources for time critical applications allowing for data concerned with the time critical application to have an increased quality of service. However; the current solutions have drawbacks in the form of risking loosing data during setting up these additional radio resources for time critical applications. The present invention therefore has an object to solve this problem.

SUMMARY OF THE INVENTION

This is done by providing a method of masquerading for the flow of data packets so as to guarantee a transfer of data packets during the setup of radio resources and logical channels.

This may be utilized in a number of different aspects of the present invention where the first is a method for allocating resources in a telecommunications network, the method comprising:
  sending a request to a gateway support node from a service support node for creating a secondary Packet Data Protocol (PDP) context;
  redirecting downlink packets for the secondary PDP context to a primary PDP context;
  establishing the secondary PDP context; and,
  sending from the service support node an update of PDP context creation for redirecting data flow for the secondary PDP context from the primary PDP context to the secondary PDP context.

The method may further comprise the steps of:
  including a filter function in the request for creating the secondary PDP context for redirecting data packets to the primary PDP context; and,
  sending to the gateway support node a request for updating the PDP context including a Traffic Flow Template (TFT) comprising information about the secondary PDP context in the request for updating.

The method may further comprise the steps of:
  including in the request for creating the secondary PDP context a tunnel end-point identifier (TEID) to the primary PDP context; and,
  sending a request for updating the secondary PDP context including a TEID for the secondary PDP context in the request for updating.

The data flow may be transmitted in a pre-established primary PFC/RAB (Packet Flow Context/Radio Access Bearer) for downlink secondary data packets until a secondary PFC/RAB is established in the secondary PDP context.

The method may further comprise a charging functionality.

Another aspect of the present invention, a service support node (SGSN) in a telecommunications network is provided, comprising a redirecting arrangement for providing redirection of data packets for a secondary packet data protocol (PDP) context to a primary PDP context and the node further comprising means for sending update information to a gateway support node (GGSN) for redirecting data flow of the secondary PDP context from the primary PDP context to the secondary PDP context when the secondary PDP context is established.

The service support node may further comprise an arrangement for sending a request for creating the secondary PDP context and including a filter for redirecting data packets for the secondary PDP context to the primary PDP context in the request for creating the secondary PDP context.

The arrangement for sending update information may further comprise an arrangement for including a Traffic Flow Template (TFT) for the secondary PDP context.

The service support node may further comprise an arrangement for including a tunnel end-point identifier (TEID) to the primary PDP context for the secondary PDP context in a request for establishing the secondary PDP context.

The service support node may further comprise means for including a TEID for the secondary PDP context in the update information to the GGSN.

Yet another aspect of the present invention, a telecommunications infrastructure network is provided, comprising at least:
  a radio communication interface for communication between a mobile unit (1) and the telecommunications infrastructure network;
  a service support node (SGSN) connected to the radio communication interface; and
  a gateway support node (GGSN) connected to the SGSN;
  wherein the SGSN comprises an arrangement for providing redirection of data packets for a secondary packet data protocol (PDP) context to a primary PDP context and further comprising an arrangement for sending update information for redirecting data flow of the secondary PDP context from the primary PDP context to the secondary PDP context when the secondary PDP context is established.

DEFINITIONS

GPRS—General Packet Radio Service
WCDMA—Wideband Code Division Multiple Access

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1A:
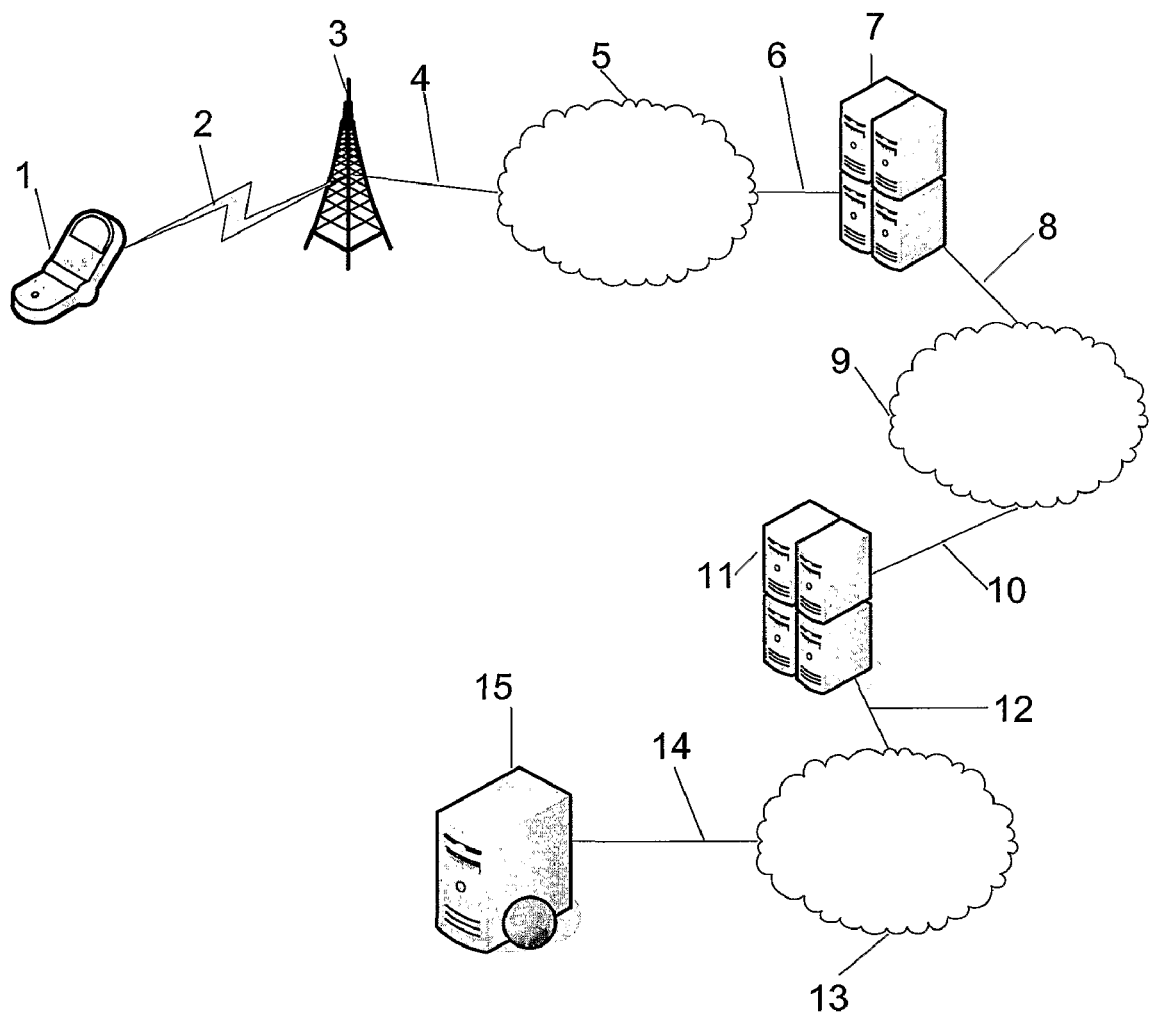
FIG. 1a illustrates a network configuration according to the present invention.

In FIG. 1*a* where in a network according to the present invention is illustrated, reference numeral 1 generally denotes user equipment 1 (MS=Mobile Station) connected via a wireless link 2 to a base station 3. The base station 3 is connected to an intermediate network 5 and further to an SGSN (Service GPRS Support Node) 7 via several communication links 4 and 6. The SGSN is in turn connected to a GGSN (Gateway GPRS Support Node) 11 via network links 8 and 10 and network 9. The GGSN is in turn connected to a packet based network, public or private, for instance Internet 13 to an application server 15 via one or several communication links 12 and 14. The application server 15 may be offering services for streaming data, such as video or audio data.

Figure 1B:
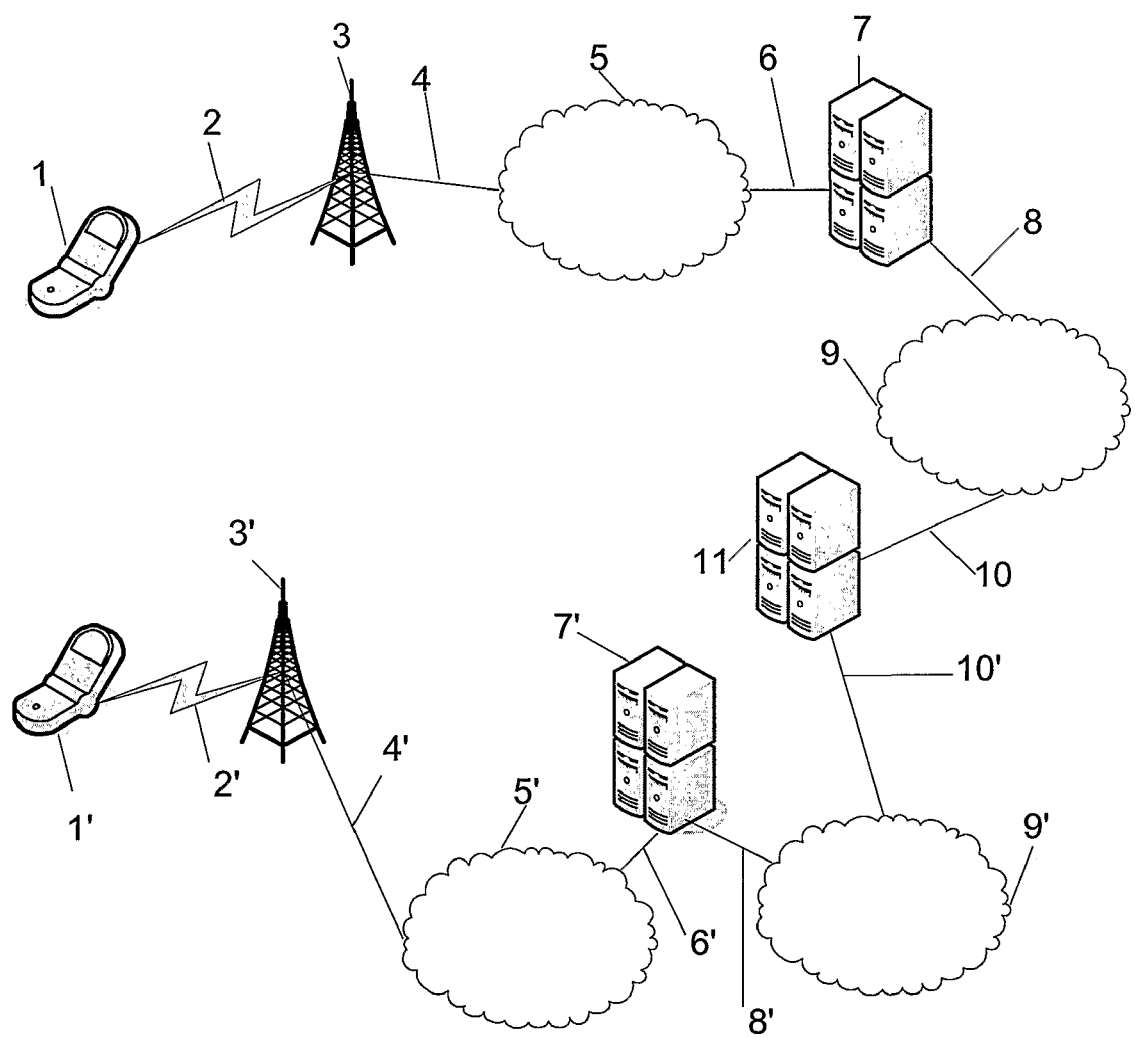
FIG. 1b illustrates another network configuration according to the present invention.

FIG. 1*b* illustrates another network configuration where the first user equipment 1 communicates with second user equipment 1'. The data are transferred in a similar manner as described for FIG. 1*a* up to the GGSN 11, and there from downstream using a similar communication configuration 10' to 2' to the second user equipment 1'. During normal conversations, quality of service (QoS) issues are handled by the normal radio resources, however in case of for instance a push to talk application the radio resources will not be aware of the time criticality of the application, but the system need to handle this by opening an extra channel for the time critical application while maintaining a channel for the non time critical application, for instance signaling, protocol, and identification data needed for maintaining and opening connections. The communication evolves through a similar network setup as described in relation to FIG. 1*a* with the difference that instead of communicating with application services located on a packet based network 13, telecommunication infrastructure network parts are involved at both ends. Also in this type of network configuration an application server (not shown) may be used as was illustrated with the application server (15) in FIG. 1*a*.

The present invention is mainly concerned with handling downlink packets for applications demanding a certain Quality of Service (QoS), so as to decrease the risk of loosing packets during the process of opening a link with sufficient QoS for the specific application, packets may be buffered but depending on the time for setting the new resources the buffer size may not be sufficient and therefore packets may be lost. Packets for the time and/or delivery critical application is routed via the first established link during the link establishing process, thus, even though data packets travel in a link that maybe is not provided with a correct QoS level for that application, packets are at least delivered to the final destination, whereas if this procedure had not been used, packets might have been lost during the setup and establishment of this second link with correct QoS for this application. This can be done using several different ways and advantageously solved by an implementation that can be implemented at one infrastructure location in order to reduce implementation costs and complexity.

Figure 2A:
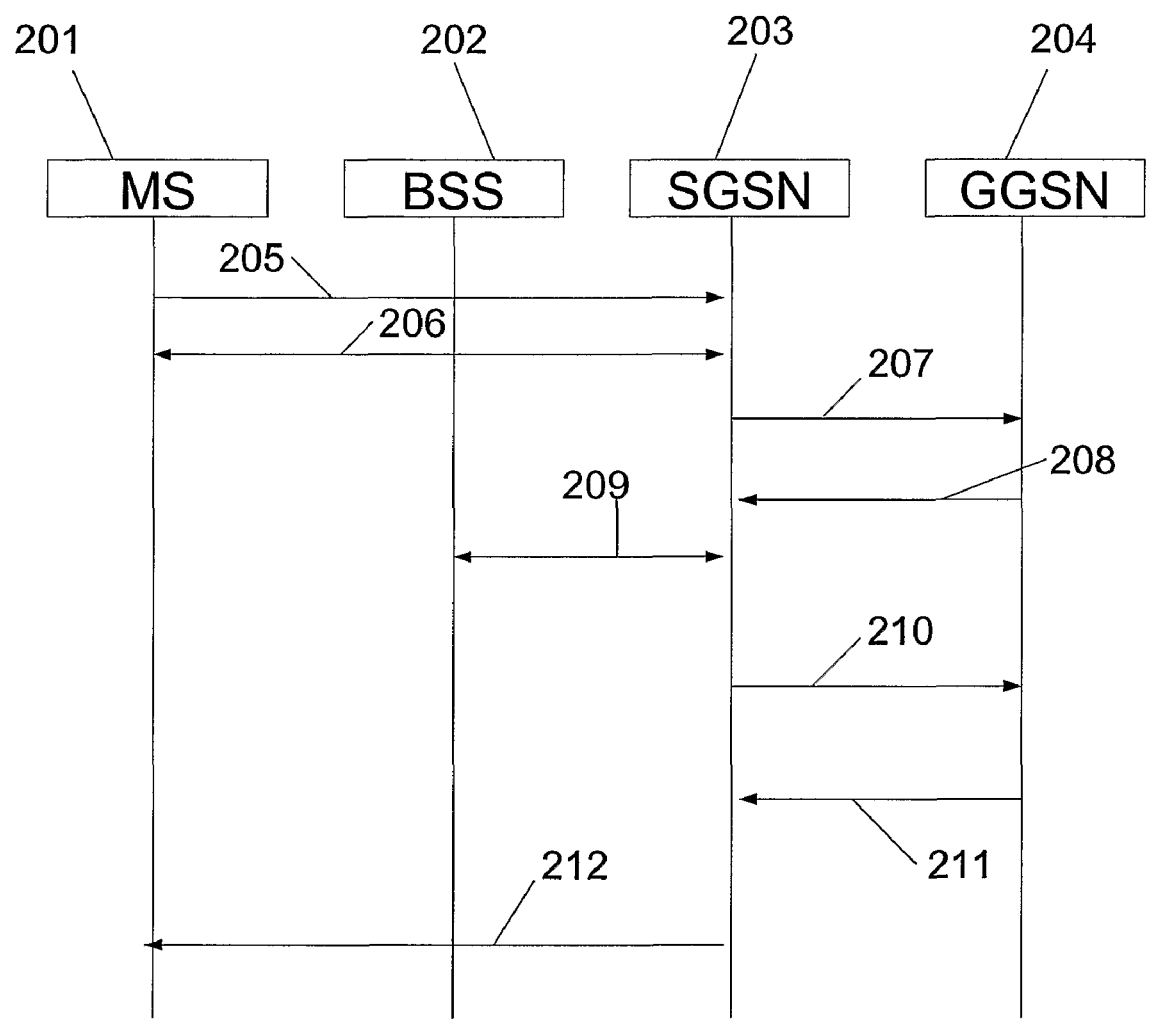
FIGS. 2a and b illustrates a signaling diagram according to the present invention for two different variations.
Figure 2B:
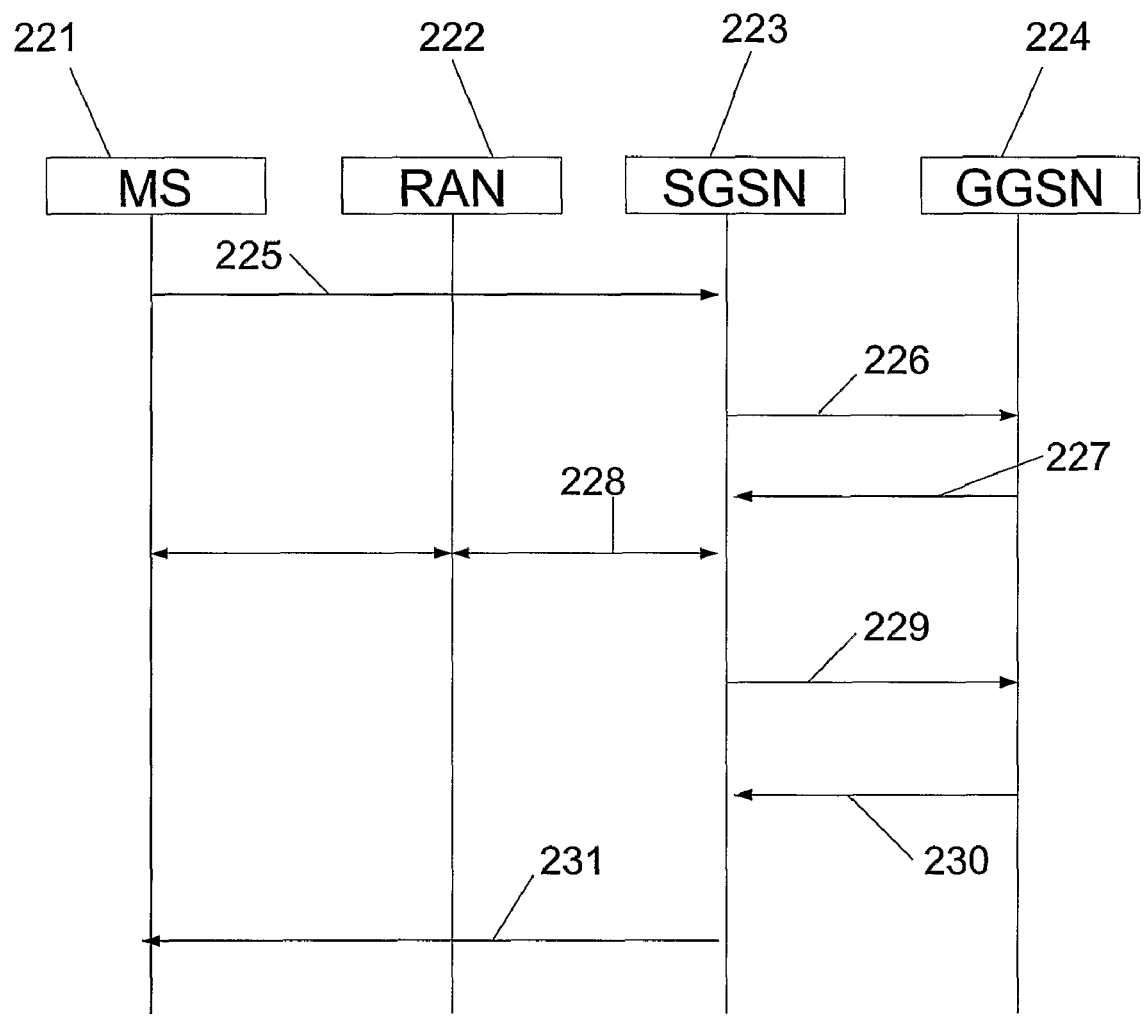

FIGS. 2*a* and 2*b* illustrate signaling flow for two different embodiments of the present invention using similar messaging structure, for setting up a secondary PDP (Packet Data Protocol) context for a time critical application. FIG. 2*a* shows the signaling flow for an activation procedure for A/Gb mode (i.e. over the A and Gb interfaces of the telecommunications infrastructure network). A mobile station (MS) 201 sends a request 205 for activating a secondary PDP context to an SGSN 203 via a BSS (Base Station System) 202. The SGSN 203 will execute appropriate security functions 206 towards the MS 201 and create 207 a PDP context request to a GGSN 204 in the network. The GGSN returns a response 208 to the create PDP context request to the SGNS. Intermediate BSS packet flow context procedures 209 are executed and the SGSN sends a request 210 for update of PDP context for which the GGSN sends a response 211 of update PDP context. The SGSN is now ready to accept 212 the activation of secondary PDP context.

FIG. 2*b* shows a similar network; however, with an Iu interface (UTRAN interface between the radio network controller (RNC) and CN (Core Network)) instead of the A/Gb interfaces used for FIG. 2*a*. The MS 221 sends a request 225 to activate secondary PDP context to the SGSN 223 over a RAN (Radio Access Network) 222. The SGSN 223 sends a request. 226 to create PDP context to the GGSN 224 which responds 227 to the create PDP context. The SGSN then sets up 228 the RAN and sends a request 229 for update of PDP context to the GGSN 224 which returns 230 a response to the update PDP context. The SGSN is now ready to accept 231 the request to activate secondary PDP context.

In both FIGS. 2*a* and 2*b* intermediate charging functions may be implemented at suitable instances of the process in order to handle charging/billing issues associated with the communication. These are not shown but may be located for instance between steps 206 and 207 and between steps 211 and 212 in FIG. 2*a* and between steps 225 and 226 and between steps 230 and 231 in FIG. 2*b*. One such charging function may be implemented using Customized Applications for Mobile Network Enhanced Logic (CAMEL) packet.

Figure 3A:
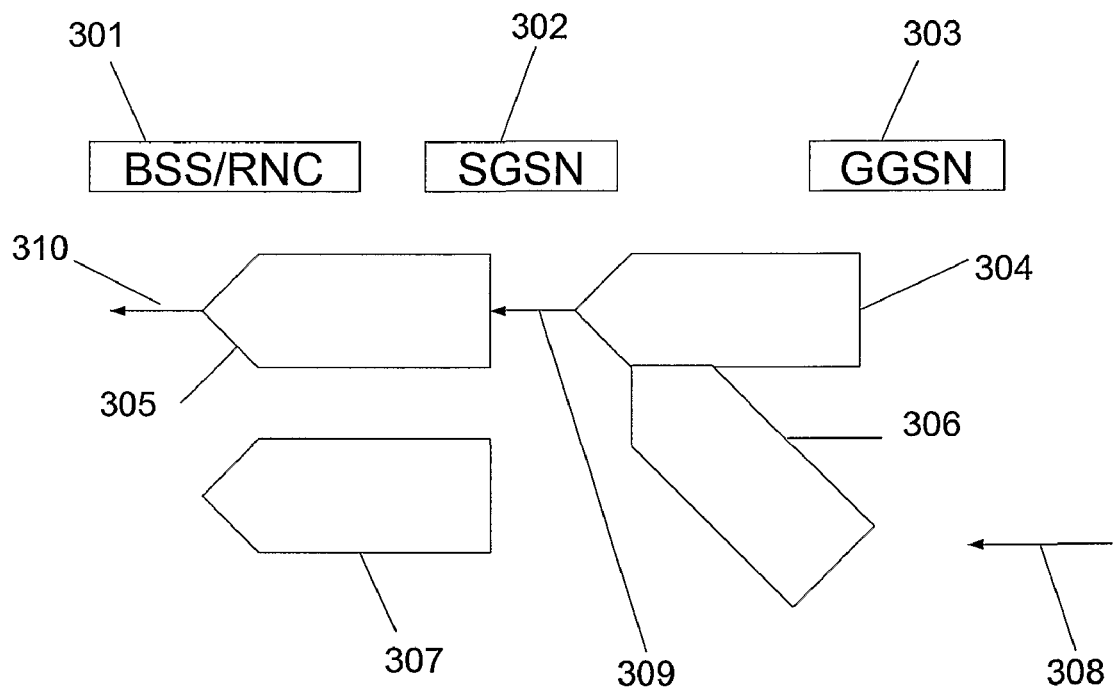
FIGS. 3*a* and *b* illustrates schematically data flow diagrams according to the first embodiment of the present invention.
Figure 3B:
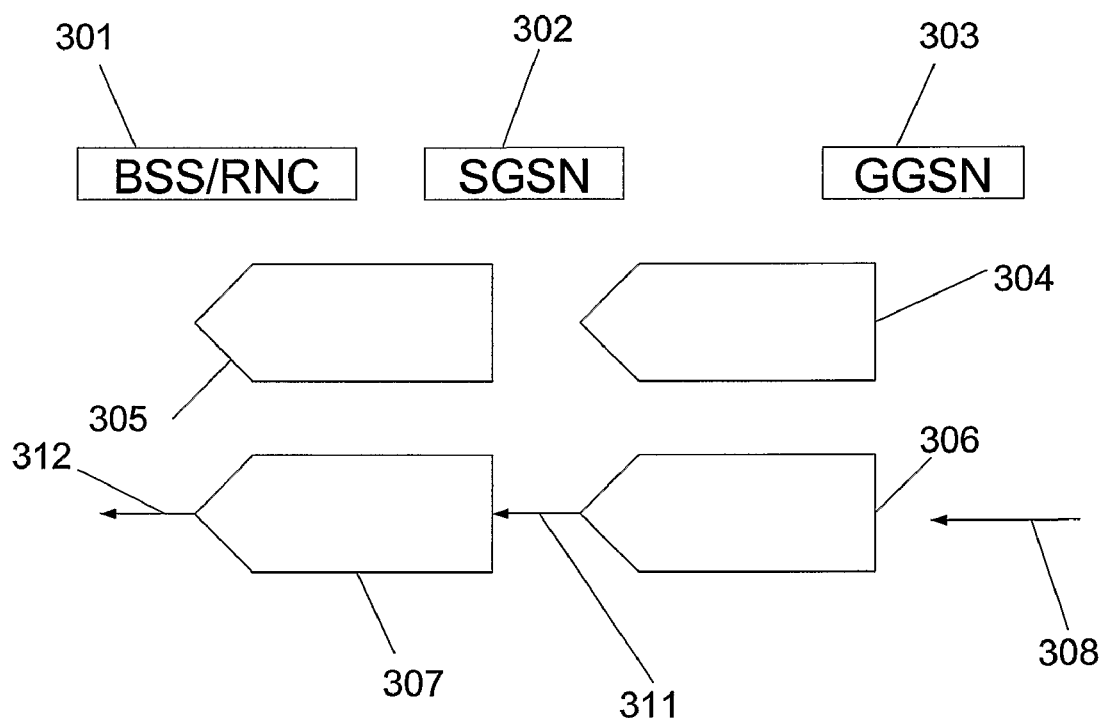

FIG. 3*a* illustrates schematically how downlink packets are handled prior to establishing the second link and FIG. 3*b* illustrates schematically how downlink packets are handled after the second link has been established. In FIG. 3*a* a GTP (GPRS tunneling protocol) tunnel is established at step 208 and 227 as seen from FIG. 2 between the SGSN and GGSN and any downlink packet 308 for the secondary PDP context will be forwarded from the GGSN to the SGSN. However, negotiation with the radio network is performed afterwards and therefore the SGSN may receive downlink packets before the PFC or RAB is established. By using the same TEID (Tunnel End-point IDentifier) for the primary and secondary PDP context request message to the GGSN both GTP tunnels will have the same end point in the SGSN. Thus the already established primary PFC/RAB (Packet Flow Context/Radio Access Bearer) will be used for downlink secondary packets, i.e. even though packets are forwarded at slower rate, delayed, or with less QoS, they will still be delivered. The process may be described as follows: referring to FIG. 3*a*, a data packet 308 for communication in the secondary PDP context is transferred into the secondary PDP context 306 at the GGSN 303; however, the TEID for that secondary PDP context is the same as for the primary PDP context 304 and transferred 309 to the primary PFC/RAB 305 from the SGSN 302 to the BSS/RNC 301 (RNC=Radio Network Controller) and further down link 310 to the MS. The secondary PFC/RAB 307 is not established yet.

Now referring to FIG. 3b, when the secondary PFC/RAB 307 is properly established with a request to update the secondary PDP context including a TEID for the secondary PDP context, the data packet 308 for the secondary PDP context enters into the PDP context 306 of the secondary PDP context and transferred 311 to the secondary PFC/RAB 307 and further down link 312 to the MS.

Figure 4A:
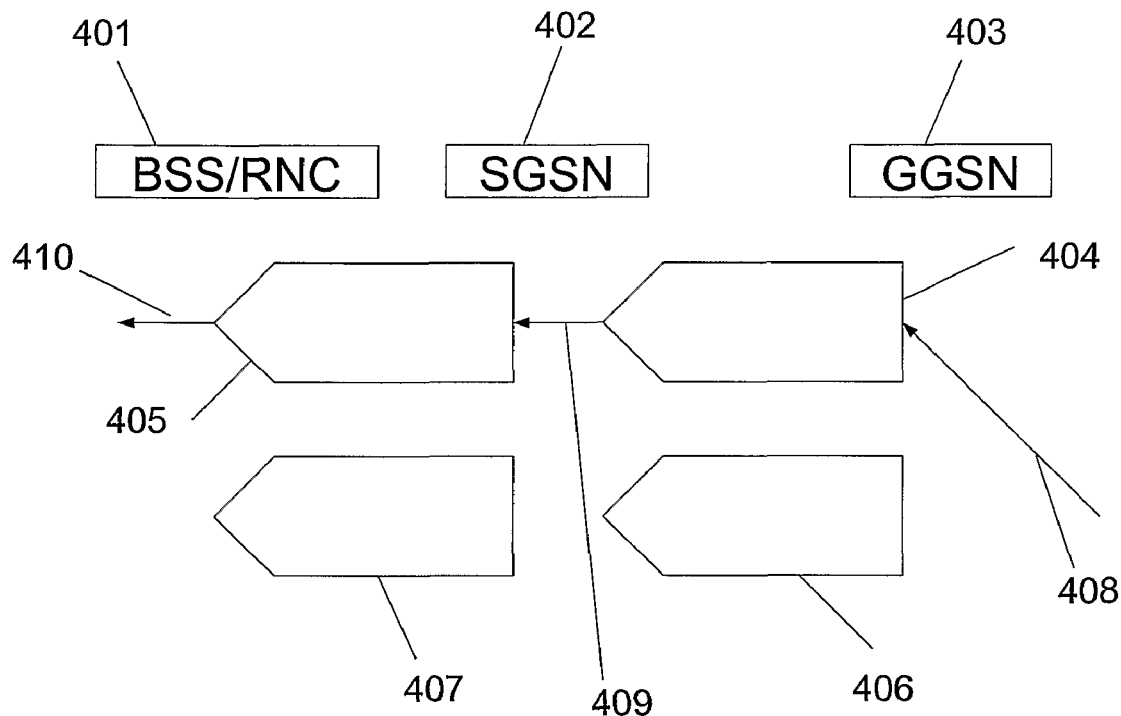
FIGS. 4*a* and *b* illustrates schematically data flow diagrams according to the second embodiment of the present invention.
Figure 4B:
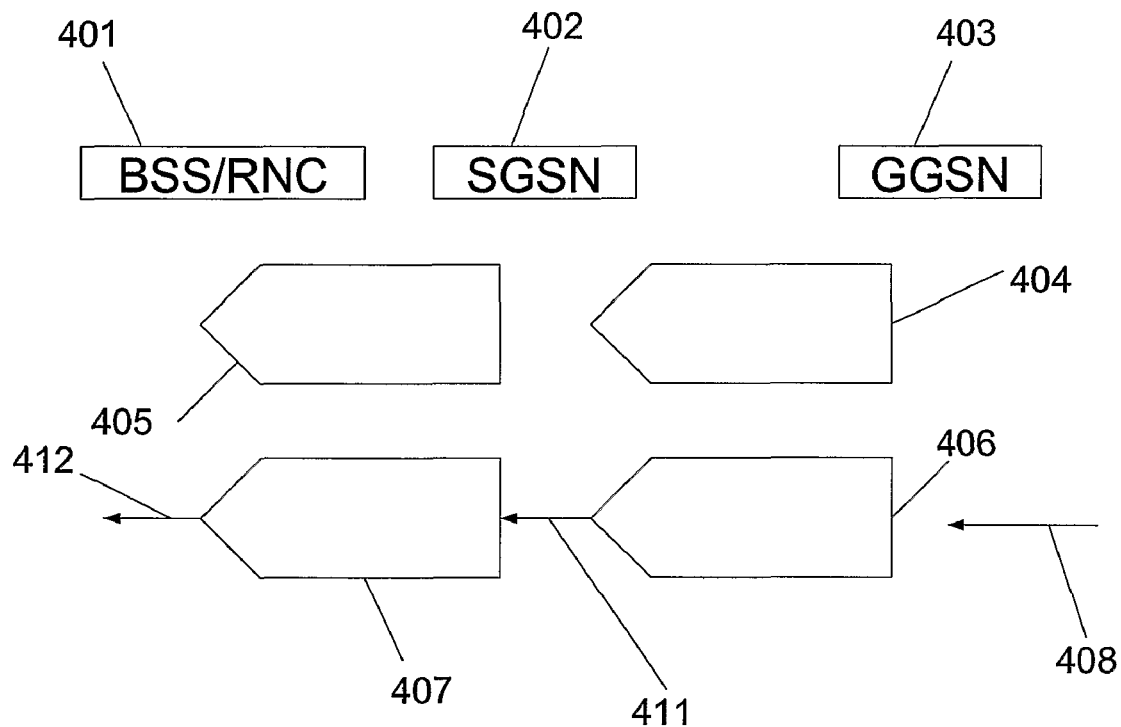

The embodiment of the present invention shown in FIGS. 3a and b is concerned with using the same TEID for both primary and secondary PDP context during setup of resources. However, in an alternative embodiment it is possible to include a filter function or configuration (in for instance a Traffic Flow Template, TFT) for redirecting the data packets at the GGSN level for instance as part of the request for creation of the secondary PDP context; the same signaling process is used as described in FIGS. 2a and b. This embodiment is illustrated in FIGS. 4a and b, wherein a GTP tunnel is established (at step 208 and 227 from FIGS. 2a and b) between the SGSN and GGSN nodes. Any downlink data packet for the secondary PDP context will be forwarded from the GGSN to the SGSN. However, since the negotiation with the radio network is performed afterwards, the SGSN may receive downlink data packets before the PFC or RAB is established. By including the filter in the request message to create PDP context to the GGSN from the SGSN, the already established primary PFC/RAB will be used for downlink secondary data packets. A filter will effectively be situated uplink of the GGSN and steer secondary data packets down the primary PDP context until the secondary PDP context has been properly established with for instance a request to update PDP context including a TFT (Traffic flow Template) for the secondary PDP context to redirect the downlink packets to the now established secondary PFC/RAB. Both the TEID and the TFT solutions have a benefit of being implemented only in the SGSN, leaving the GGSN, BSS and RNC unaffected, i.e. masquerading or fooling the system as to believe that data packets for the secondary PDP context should be sent using the primary PDP context until the secondary link has been established properly. The process may be described as follows for the TFT process: referring to FIG. 4a, a data packet 408 for communication in the secondary PDP context 406 is transferred into the secondary PDP context 406 at the GGSN 403; however, a filter for redirecting data packets for that secondary PDP context to the primary PDP context is included in the creation request and thus any data packets 408 will be transferred in the primary PDP context 404 and transferred 409 to the primary PFC/RAB 405 from the SGSN 402 to the BSS/RNC 401 and further down link 410 to the MS. The secondary PFC/RAB 407 is not established yet. Now referring to FIG. 4b, when the secondary PFC/RAB 407 is established with an update request including a TFT for the secondary PDP context the data packet 408 for the secondary PDP context enters into the PDP context 406 of the secondary PDP context and transferred 411 to the secondary PFC/RAB 407 and further down link 412 to the MS.

One aspect that one may want to consider is how to handle billing matters in the two above described embodiments. In the first embodiment, the GGSN does not know which way the packet actually has been directed and therefore data packets may be booked for using other resources than what actually was used. This may lead to that a user would be charged for resources not used or with a wrong price. Therefore the infrastructure may be provided with charging/billing applications for compensating for this and comparing actual used PDP context and resources with the perceived. In the second embodiment using the filter the GGSN knows which resources the data packets have used and therefore the billing aspects of the communication may be solved.

Figure 5:
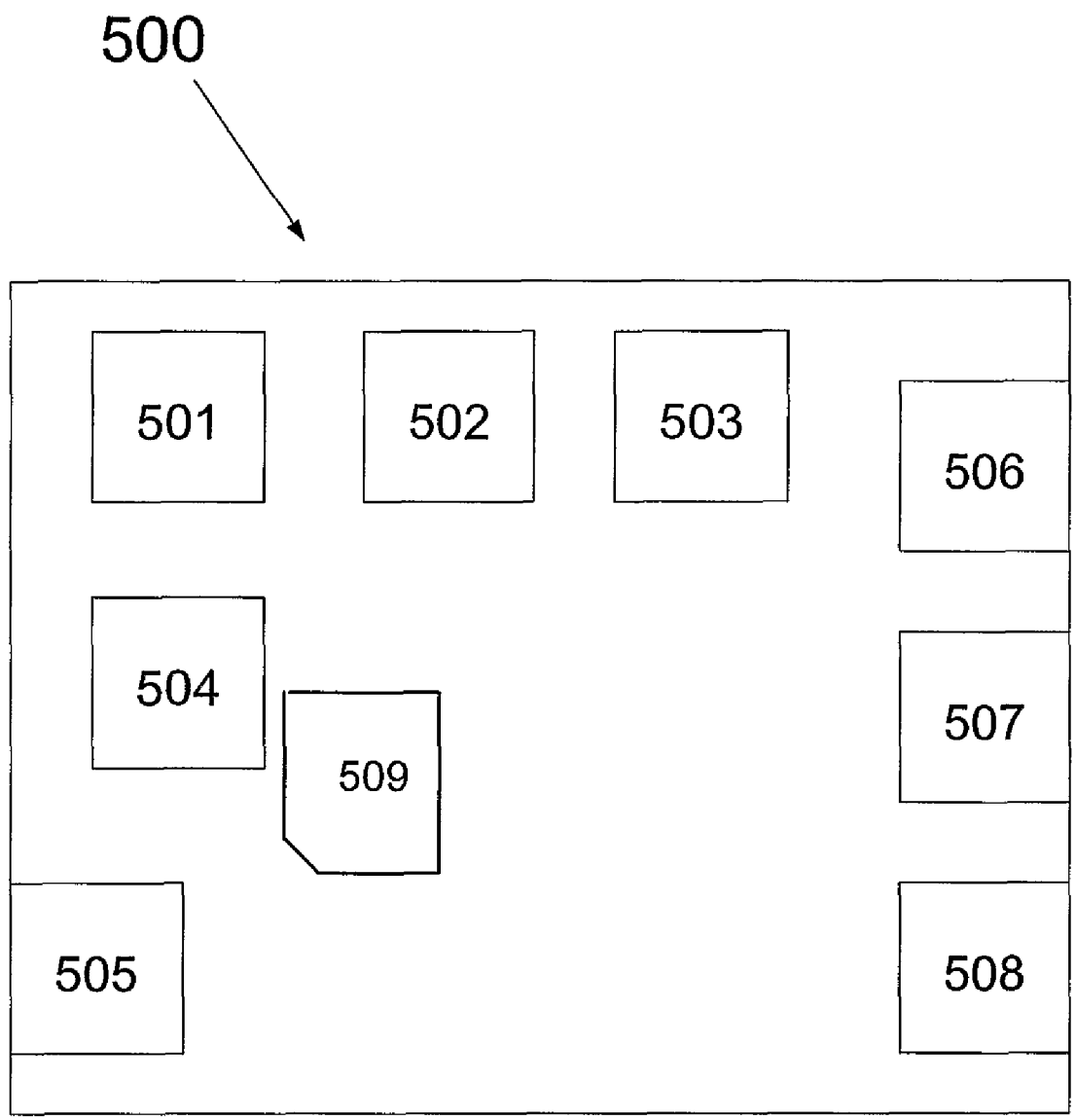
FIG. 5 illustrates in a schematically block diagram a service support node according to the present invention.

Turning now to FIG. 5, illustrating a service node 500 according to the present invention, the support node may comprise a computational unit 501, a storage unit 502, an interface unit 503 and a first communication interface 506. The service node may further comprise a second interface 504 and a second communication interface 505. A charging unit 509 may be provided as well for handling charging/billing aspects of the communication. More communication interfaces 507 and 508 may be provided as well depending on the configuration of the support node. The computational unit is arranged to send request for PDP context creations and amending such messages in order to control the data packet flow. The storage unit 502 is arranged to store programs and data flow data running in the computational unit 501. The interfaces 502 and 504 are arranged to handle communication between the computational unit 501 and respective communication interface 506 and 505. Additional communication interfaces and interfaces may be provided in order to increase the bandwidth and/or QoS of the support node 500. The present invention is advantageously implemented in the SGSN.

The present invention is conveniently solved in software stored in a computer readable medium at any suitable location for use in the telecommunications infrastructure network. However, it should be understood that it may also be implemented as hardware in part.

The present invention may be implemented to several different telecommunications networks such as but not limited to 2G, 2.5G, and 3G and possibly future variations of these; however, it is advantageously used in WCDMA networks due to the network topology of these networks.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means", "devices", or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method for allocating resources in a telecommunications network, the method comprising the steps of:
sending a request for creating a secondary Packet Data Protocol (PDP) context to a gateway support node from a service support node;
redirecting downlink packets for said secondary PDP context to a primary PDP context;
establishing said secondary PDP context; and,
sending from said service support node an update of PDP context creation for redirecting data flow for said secondary PDP context from said primary PDP context to said secondary PDP context;
further comprising the steps of:
including a filter function in said request for creating said secondary PDP context for redirecting data packets to said primary PDP context; and,
sending to said gateway support node a request for updating said PDP context including a Traffic Flow Template (TFT) comprising information about said secondary PDP context in said request for updating.

2. A method for allocating resources in a telecommunications network, the method comprising the steps of:

sending a request to a gateway support node from a service support node for creating a secondary Packet Data Protocol (PDP) context;

redirecting downlink packets for said secondary PDP context to a primary PDP context;

establishing said secondary PDP context; and, sending from said service support node an update of PDP context creation for redirecting data flow for said secondary PDP context from said primary PDP context to said secondary PDP context;

further comprising the steps of:

including in said request for creating said secondary PDP context a tunnel end-point identifier (TEID) to said primary PDP context; and, sending a request for updating said secondary PDP context including the TEID for said secondary PDP context in said request for updating.

3. The method according to claim 1, wherein data flow is transmitted in a pre-established primary Packet Flow Context/Radio Access Bearer (PFC/RAB) for downlink secondary data packets until a secondary PFC/RAB is established in said secondary PDP context.

4. The method according to claim 1, further comprising a charging functionality.

* * * * *

UNITED STATES PATENT AND TRADEMARK OFFICE
CERTIFICATE OF CORRECTION

| | | |
|---|---|---|
| PATENT NO. | : 8,107,450 B2 | Page 1 of 1 |
| APPLICATION NO. | : 12/159743 | |
| DATED | : January 31, 2012 | |
| INVENTOR(S) | : Ahlstrom et al. | |

It is certified that error appears in the above-identified patent and that said Letters Patent is hereby corrected as shown below:

In Column 14, Line 14, delete "SGNS." and insert -- SGSN. --, therefor.

Signed and Sealed this
Twenty-fourth Day of April, 2012

David J. Kappos
*Director of the United States Patent and Trademark Office*